No. 661,119. Patented Nov. 6, 1900.
W. V. ESMOND.
KINETOGRAPHIC CAMERA.
(Application filed Feb. 25, 1899.)
(No Model.) 3 Sheets—Sheet 1.
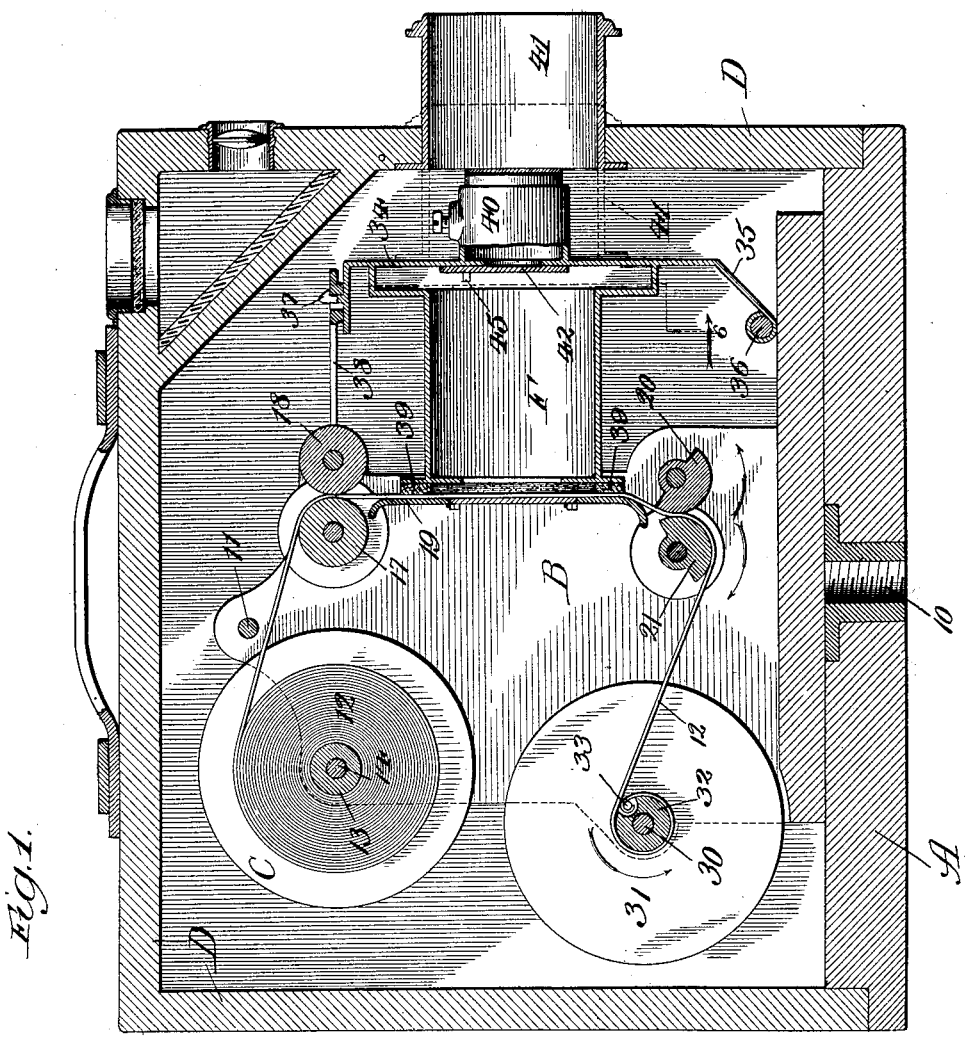
Witnesses:
Inventor:
William V. Esmond
By
Attys.

No. 661,119. Patented Nov. 6, 1900.
W. V. ESMOND.
KINETOGRAPHIC CAMERA.
(Application filed Feb. 25, 1899.)
(No Model.) 3 Sheets—Sheet 2.
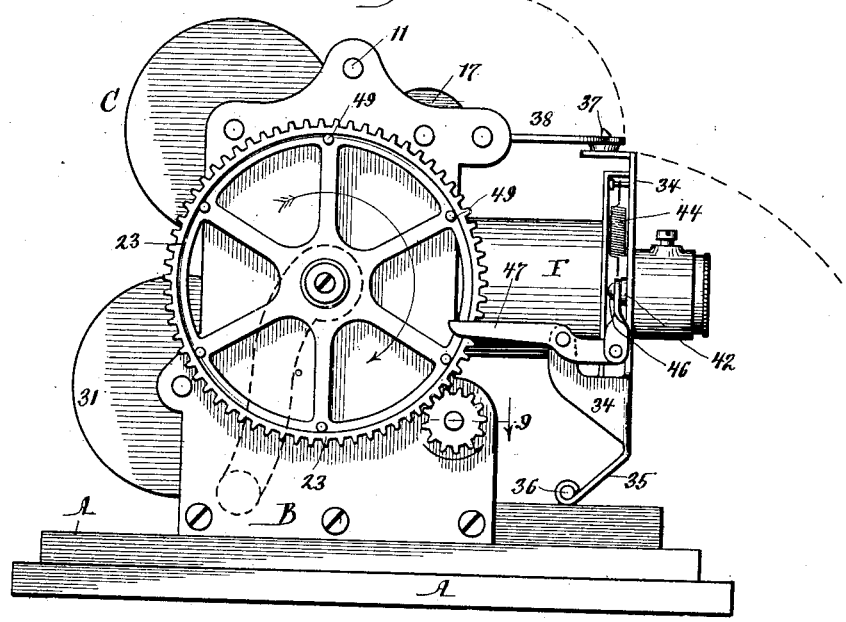
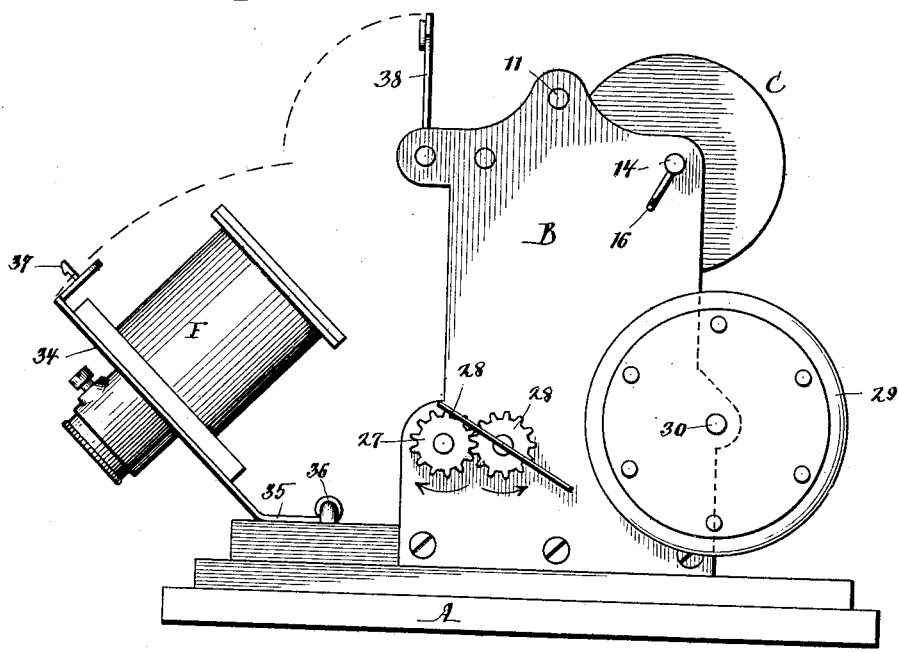

No. 661,119. Patented Nov. 6, 1900.
W. V. ESMOND.
KINETOGRAPHIC CAMERA.
(Application filed Feb. 25, 1899.)
(No Model.) 3 Sheets—Sheet 3.
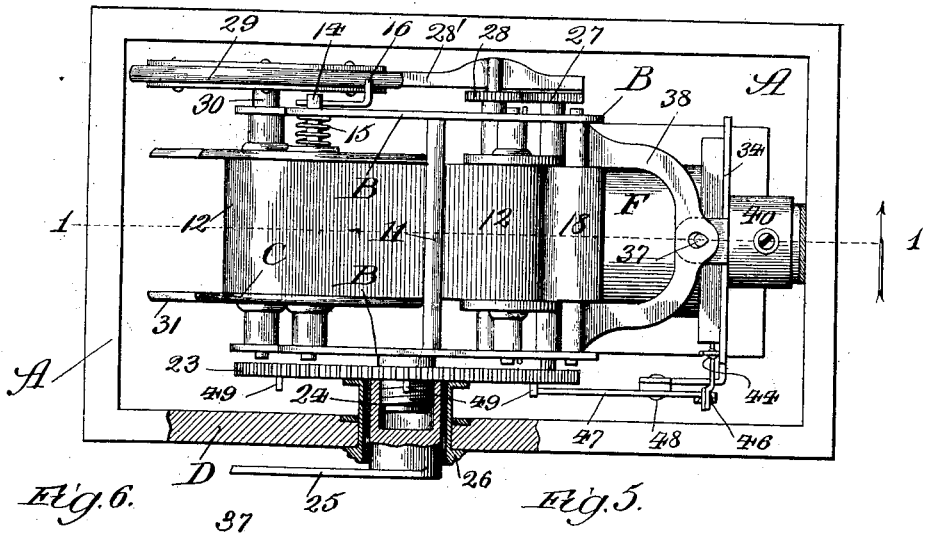
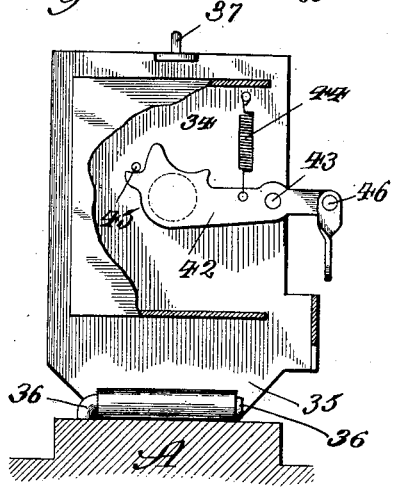
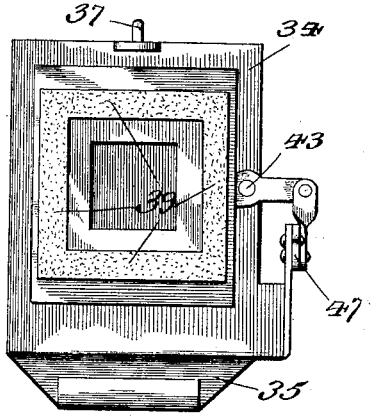
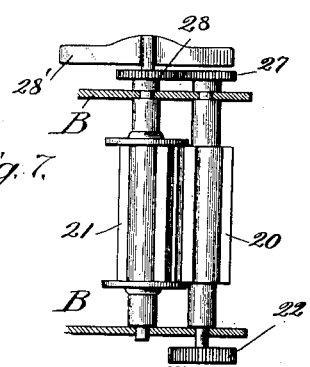
Witnesses:
Inventor:
William V. Esmond
By Brice Fisher
Attys.

UNITED STATES PATENT OFFICE.

WILLIAM V. ESMOND, OF CHICAGO, ILLINOIS, ASSIGNOR, BY MESNE ASSIGNMENTS, TO THE MOVING PICTURE CAMERA COMPANY, OF SAME PLACE.

KINETOGRAPHIC CAMERA.

SPECIFICATION forming part of Letters Patent No. 661,119, dated November 6, 1900.

Application filed February 25, 1899. Serial No. 706,810. (No model.)

*To all whom it may concern:*

Be it known that I, WILLIAM V. ESMOND, a resident of Chicago, in the county of Cook and State of Illinois, have invented certain new and useful Improvements in Photographic Cameras, of which the following is hereby declared to be a full, clear, and exact description.

Apparatus employed by photographers for taking in quick succession a series of pictures—generally of some moving object—are now in familiar use. The pictures result from the rapid exposure and withdrawal of progressive lengths of a continuous sensitized film or strip momentarily held still for each exposure at the focal plane of the camera-lens. The set of impressions thus derived after development, &c., in the usual way constitute the negative from which a positive transparent strip can be printed. By moving the positive transparency across the field of a magic lantern or like device the successive images are projected onto the screen and afford a lively reproduction of the original scene. Pictures of this sort bear various trade-names, such as biographs, kinematographs, &c.

The present invention designs to provide a simple and compact apparatus capable of effective use for taking the set or series of negative impressions on the sensitized strip according to the plan above mentioned.

The exact nature of the invention will appear in detail from the description following and be more particularly pointed out by claims at the conclusion thereof.

On the drawings like parts bear like designation throughout.

Figure 1 is a view in longitudinal section on line 1 1 of Fig. 4, showing the display apparatus mounted in place within the camera-box. Fig. 2 is a side elevation of the apparatus, the cover of the box being removed; Fig. 3, a like view at the opposite side with the focal tube thrown into open position. Fig. 4 is a view in plan, parts in section, of the complete device, the cover being off. Fig. 5 is a detail elevation at the rear end of the shutter-tube. Fig. 6 is a detail sectional view at line 6 6, Fig. 1, displaying the shutter and its mount at the front of the tube; Fig. 7, a detail sectional view at line 9, Fig. 2, showing the feed and the kick-off devices.

As here shown, the base A for the camera is rectangular in form, with threaded socket 10 to receive the head of the supporting-tripod in familiar fashion. At opposite sides of base A extend the parallel upright standards B, united by cross-stretcher 11 and affording suitable mounts for the pintles of the several reels and rolls. The continuous film or sensitized strip 12, upon which the series of impressions are to be taken in negative by rapid exposure of successive lengths of the film in quick succession, is wound about the spool 13 of main reel C. The reel C, with prepared film 12 coiled thereon, can be secured in place at will by inserting the long axle 14 through spool 13, the ends or pintles of said axle resting in journal-holes at upright standards B. A spline-and-feather or like joint unites the axle and spool against rotary play. Coil-spring 15, encircling axle 14, Fig. 4, engages the face of spool 13 and the confronting inner face of one of the standards. By its elastic contact the spring serves as a brake to prevent reel C from overrunning. Handle 16 at outer end of axle 14, Figs. 3 and 4, permits reel C to be rewound or to be dismounted, as desired, on endwise withdrawal of the axle.

The free end of film 12 passes at the front between flanged guide-roll 17 and the companion idler 18, both of which are carried in parallel relation between bearings at standards B. A cross-plate 19, curved at its upper and lower ends for easy guidance of the strip, is secured at opposite edges to standards B, and being located in the focal plane there affords a firm support to keep the film smoothly extended during the period of exposure. It is seen that the contact-line of guide-roll 17 with idler 18 is substantially in the plane of cross-plate 19. This location of the parts aids in maintaining the exposed film-surface at true focal length throughout.

Below the cross-plate 19 is the pair of feed-rolls 20 21, freely revolving in journals at standards B and cut away or mutilated, as shown, over a portion of their peripheries, so that the rolls will bite and advance the interposed strip 12 only during the period when the unmutilated or full portions of the roll-peripheries confront each other in course of rotation. By varying the arc length of the full portion of the rolls it is obvious that a greater or less length of strip can be advanced at each complete turn, as may be desired. The outer or driving roll 20 of the feed pair carries at one terminal the pinion 22, Figs. 2 and 7, which meshes with the master gear-wheel 23. Said wheel is freely sustained at its hub on a stud-journal projecting from standard B, Fig. 4, the wheel-hub being externally threaded to engage with the socket 24 of drive-crank 25. A suitable hole in the removable camera-cover D permits the crank 25 to be fastened to the hub of wheel 23 when required, while a metal bushing 26 surrounds the hole, and on being thrust inward, Fig. 4, bears at one terminal flange against the smooth face of wheel 23 and at the opposite terminal flange against the outer face of cover D to insure a light-tight joint at the hole. If crank 25 be taken off, the bushing 26 is slid outward clear from the path of any fixed part which might otherwise interfere with the ready removal of cover D. With crank 25 in position the operator can turn master-wheel 23 in the direction indicated by the arrow, Fig. 2, thus rotating the driver-roll 20, which latter through pinion 27 at its far end coacts with like pinion 28 on driven roll 21, Figs. 4 and 7, to compel a reverse movement thereof. The continuous strip or film held between the rolls is fed forward in successive portions, the rapidity of the advance being governed by the speed of rotation imparted to the feed-rolls. The rolls may be clothed with rubber or other elastic material to insure lightness of touch against the film.

Upon the far terminal of driven roll 21 is attached the "kick-off" 28', which consists of a flat flexible metal strip designed to contact at each half-turn with the leather or like yielding rim of wheel 29, Figs. 3 and 4. Said wheel fastens on the outer end of axle 30, journaled in standards B. Take-up reel 31 has its spool or drum 32 rigidly sleeved upon axle 30, Fig. 1. In a longitudinal recess of sleeve 32 is set the wire catch 33 to receive and detain the free end of the continuous strip in familiar fashion. Once the strip is secured at the catch the movement of reel 31, effected by contact of kick-off 28' with wheel 29, enables the reel to take up slack in the strip, winding such portion upon reel 31 after it has escaped from the grip of feed-rolls 20 21.

Mounted in advance of the strip-feeding mechanism is the focal tube F, conveniently made in cylindric form, with an enlarged front chamber securely closed by the upright plate 34. The leg 35, at the lower part of plate 34, bends backward at an angle, Fig. 1, and pivots upon an open pintle 36, projecting from base A, Fig. 6. By lateral shift of leg 35 the upright plate 34, together with tube F, can be removed or replaced, as desired, or, again, by hinge movement on pintle 36 said parts are thrown forward to a position of rest, Fig. 3, with the face of leg 35 bearing against the base.

The top of upright plate 34 carries a pin 37 to engage with yoke-latch 38, pivoted upon the axle of idler 18. When the latch is thrown down to encounter its pin, the focal tube is forced slightly backward, bringing the velvet or like pad 39, affixed to the rear of said tube, into snug contact with strip 12. The strip is thus kept smooth and straight between the confronting faces of cross-plate 19 and pad 39. By extending the focal tube F into position closely confronting the ribbon strip it is seen that the light admitted has no tendency to "cloud" the strip, since the light is confined by the tube and merely acts upon that portion of the sensitized ribbon immediately behind the tube-opening at the rear.

The upright plate 34 of the focal tube sustains a cylindric socket 40 for adjustably seating the photographic lens. Flanged bushing 41, at the hole of the camera-cover in advance of the lens, may project, as shown, Fig. 1, when the cover is to be taken off, but is thrust inward to the position denoted by dotted lines (thus insuring a light-tight joint about the hole) during the time that the apparatus is in use.

Within the enlarged chamber at the forward part of focal tube F is mounted the shutter 42, pivoted, as at 43, on the back of upright plate 34, Fig. 6, and furnished with the usual spring 44 and stop 45 to normally position the shutter against the hole in said plate. The free outer end of shutter 42 is pivoted, as at 46, to trip-lever 47, which latter finds convenient fulcrum at 48 on an ear or lug of upright plate 34. The heel of trip-lever 47 extends rearward into the path of a series of pins 49, projecting at stated intervals from the face of master-wheel 23. The distance between pins 49 depends upon the throw of feed-rolls 20 21. After the rolls have advanced a given length of sensitized strip into the focal plane there is then a momentary pause in the movement of the strip. At such interval of rest pin 49 on the constantly-revolving master-wheel 23 quickly encounters trip-lever 47. Thereupon shutter 42 is snapped open, but immediately closes again when pin 49 clears the heel of trip-lever 47. This clearance is accomplished before the feed-rolls begin anew to advance a successive length of the film.

On substituting a transparency strip and applying a condensing-lens at the rear and a projecting lens at front of the camera-casing the apparatus converts into a magic lantern for display of images on a screen in familiar fashion.

Obviously the details of structure can be varied by the mechanic's skill without departure from the essentials of the invention.

In prior photographic cameras of the kind set forth herein the sensitized film was perforated along its edges and the feed of the strip was effected by the use of catch-hooks or revolving pin-wheels to engage with the holes at the strip. The holes are necessarily very close together and in rapid movement of the strip oftentimes tear out or fail to encounter the feed-pins. The negative becomes distorted and perhaps destroyed. The same difficulty is met with when the finished transparency is being projected onto a screen by magic-lantern arrangement. Defective holes in the strip cause successive images at the screen to seemingly "creep" or overlap on each other, which may easily destroy the desired effect. By my invention the perforation of the strips is wholly discarded at manifest advantage and without injury to the impressions, although the feed-rolls are brought into direct bite or grip against the film.

Having thus described my invention, what I claim as new, and desire to secure by Letters Patent, is—

1. In photographic cameras, the combination with the main reel for the ribbon strip and with the sustainer-plate to keep the strip at the focal plane, of the mutilated feed-roll and the companion roll rotating positively therewith to intermittently draw the strip directly from the main reel in successive lengths, substantially as described.

2. In photographic cameras, the combination with the main reel for the ribbon strip and with the sustainer-plate to keep the strip at the focal plane, of the equally-mutilated, intermeshing feed-rolls coacting directly with the main reel to draw the strip therefrom in definite lengths at successive intervals, substantially as described.

3. In photographic cameras, the combination with the main reel for the ribbon strip and with the sustainer-plate to keep the strip at the focal plane, of the companion mutilated feed-rolls coacting directly with the main reel to intermittently draw the strip therefrom in successive lengths, the light-excluding shutter and an automatic shifter therefor to admit the light at intervals in timed relation with the stoppage of the strip, substantially as described.

4. In photographic cameras, the combination with the main reel for the ribbon strip and with the sustainer-plate to keep the strip at the focal plane, of the mutilated feed-roll and companion roll rotating in unison therewith to directly draw the strip from the main reel, the take-up reel for the slack of the ribbon strip and suitable means coöperating with the feed-rolls to actuate said take-up reel, substantially as described.

5. In photographic cameras, the combination with the main reel for the ribbon strip, of the sustainer-plate and the lens-tube to keep the ribbon strip in the focal plane between them, the equally-mutilated, intermeshing feed-rolls, positively driven to intermittently advance successive portions of the strip past the focal plane, the shutter to exclude light from the lens-tube and automatic means for momentarily shifting said shutter in timed relation with the intermitted advance of the strip, substantially as described.

6. In photographic cameras, the combination with the main reel for the ribbon strip, of the sustainer-plate and the lens-tube to keep the ribbon strip at the focal plane between them, the mutilated feed-roll and the companion intermeshing roll rotating in unison therewith to directly draw the strip from the main reel, the light-excluding shutter for the lens-tube, automatic mechanism to shift the shutter intermittently, the take-up reel for the slack of the ribbon strip and suitable means coöperating with the feed-rolls to actuate said take-up reel, substantially as described.

7. In photographic cameras, the combination with the feed mechanism for the ribbon strip, of the sustainer-plate at the focal plane and the lens-tube with its yielding pad extended to said plane in confronting position for retention of the ribbon strip between such tube and the sustainer-plate, substantially as described.

8. In photographic cameras, the combination with the sustainer-plate and with the confronting lens-tube to keep the sensitized strip in the focal plane between them, of the mutilated feed-roll with its companion roll positively intermeshing and driven in unison to intermittently advance successive portions of the strip, the movable shutter for excluding light from the lens-tube, the revolving master-wheel and suitable connections coacting therewith to impart motion respectively to the feed-rolls and at intervals to the shifting shutter, substantially as described.

9. In photographic cameras, the combination with the main reel for the sensitized strip, the sustainer-plate at the focal plane, and the mutilated feed-rolls to intermittently advance successive portions of the strip past said plane, of the movable lens-tube having a yielding pad at the back thereof in contact with the strip to hold the same from overrunning when the grip of the feed-rolls is released, substantially as described.

10. In photographic cameras, the combination with the sustainer-plate at the focal plane, of the pivoted lens-tube having yielding pad thereon to bear against said plate, and a draw-latch engaging said tube to snugly seat the pad at bearing position, substantially as described.

11. In photographic cameras, the combination with the main reel for the ribbon strip, of the sustainer-plate at the focal plane, the pivoted lens-tube swinging into confronting position at said plane and suitable means for holding said tube in place, substantially as described.

12. In photographic cameras, the combination with the main reel for the ribbon strip, of the sustainer-plate at the focal plane, the movable lens-tube shifting into confronting position at said plane and suitable means for holding said tube in place, substantially as described.

13. In photographic cameras, the combination with the main reel for the ribbon strip and suitable mechanism to intermittently feed said strip, of the sustainer-plate at the focal plane, the lens-tube shifting into confronting position at said plane, the movable shutter with its operating-lever carried on said tube, and the master gear-wheel having a set of trip-pins thereon to successively encounter the lever, substantially as described.

14. In photographic cameras, the combination with the master gear-wheel having trip-pins thereon, of the pair of feed-rolls in mesh with said wheel to intermittently advance the ribbon strip, the focal tube with its movable shutter mounted pivotally thereon and the intermediate lever carried by said tube to encounter the gear-wheel pins and thereupon shift the shutter, substantially as described.

15. In photographic cameras, the combination with the main reel for the ribbon strip, of the sustainer-plate at the focal plane, the revolving feed-rolls to advance successive portions of the strip past said plane, the take-up reel for the slack of the strip, a winding-wheel upon the axle of the slack-reel and an intermediate "kick-off" carried by the feed-rolls to intermittently turn the winding-wheel, substantially as described.

16. In photographic cameras, the combination with the sustaining-frame having the ribbon-reel and its feed mechanism mounted thereon, of the inclosing removable box or cover provided with light-tight sliding joints at the apertures for the lens-tube and for the actuating-crank respectively.

WILLIAM V. ESMOND.

Witnesses:
JAMES H. PEIRCE,
ALBERTA ADAMICK.